(12) United States Patent
Kakino

(10) Patent No.: US 12,229,796 B2
(45) Date of Patent: Feb. 18, 2025

(54) MERCHANDISE PROCESSING DEVICE AND METHOD THEREFOR

(71) Applicant: TOSHIBA TEC KABUSHIKI KAISHA, Tokyo (JP)

(72) Inventor: Tomonari Kakino, Fuji Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/450,437

(22) Filed: Aug. 16, 2023

(65) Prior Publication Data

US 2023/0401599 A1 Dec. 14, 2023

Related U.S. Application Data

(63) Continuation of application No. 17/849,796, filed on Jun. 27, 2022, now abandoned.

(30) Foreign Application Priority Data

Dec. 14, 2021 (JP) ................. 2021-202478

(51) Int. Cl.
*G06Q 30/00* (2023.01)
*G06Q 20/20* (2012.01)
*G06Q 30/0238* (2023.01)

(52) U.S. Cl.
CPC ....... *G06Q 30/0238* (2013.01); *G06Q 20/208* (2013.01)

(58) Field of Classification Search
CPC .......................... G06Q 30/0238; G06Q 20/208
See application file for complete search history.

(56) References Cited

U.S. PATENT DOCUMENTS

| 2012/0048926 | A1 | 3/2012 | Naito et al. |
| 2012/0059692 | A1 | 3/2012 | Nemoto |
| 2016/0351023 | A1 | 12/2016 | Takeno et al. |
| 2017/0083891 | A1 | 3/2017 | Moro |
| 2019/0318144 | A1 | 10/2019 | Iizaka |
| 2021/0342876 | A1 | 11/2021 | Haneda et al. |

FOREIGN PATENT DOCUMENTS

| CN | 101470929 | 7/2009 |
| JP | 2016-177419 | 10/2016 |

OTHER PUBLICATIONS

Final Office Action for U.S. Appl. No. 17/849,796 mailed on Jun. 12, 2023.
Non-Final Office Action for U.S. Appl. No. 17/849,796 mailed on Feb. 24, 2023.

*Primary Examiner* — Meredith A Long
(74) *Attorney, Agent, or Firm* — Amin, Turocy & Watson, LLP

(57) ABSTRACT

A merchandise processing device includes an identification unit, a detection unit, and a control unit. The identification unit identifies a merchandise. The detection unit detects, based on a captured image of the merchandise, a privilege medium in which privilege information is recorded. The control unit causes a display device to display the image, on which the privilege medium is detected, in association with information related to the merchandise identified by the identification unit.

12 Claims, 10 Drawing Sheets

*FIG. 5*

| No. | MERCHANDISE NAME | NUMBER | UNIT PRICE | DISCOUNT AMOUNT | IMAGE | AMOUNT OF MONEY |
|---|---|---|---|---|---|---|
| | | | REGISTRATION DETAILS | | | |
| 1 | | | | | | |
| | | | | | | |
| | | | | | | |
| | | | | | | |
| | | | | | | |

| (MERCHANDISE NAME AND UNIT PRICE) | | (DISCOUNT AMOUNT AND IMAGE) | |
|---|---|---|---|
| NUMBER | YEN | TOTAL | 0 NUMBER<br>0 YEN |

PAY

| No. | MERCHANDISE NAME | NUMBER | UNIT PRICE | DISCOUNT AMOUNT | IMAGE | AMOUNT OF MONEY |
|---|---|---|---|---|---|---|
| 1 | AAA | 1 | 100 | 10 | | 90 |

REGISTRATION DETAILS

| BBB | | ¥500 | −250 | | |
|---|---|---|---|---|---|
| 1 NUMBER | | 250 YEN | TOTAL | | 2 NUMBER 360 YEN |

PAY

MERCHANDISE PROCESSING DEVICE AND METHOD THEREFOR

CROSS-REFERENCE TO RELATED APPLICATIONS

This application is a Continuation of application Ser. No. 17/849,796 filed on Jun. 27, 2022, the entire contents of which are incorporated herein by reference.

This application is based upon and claims the benefit of priority from Japanese patent Application No. 2021-202478, filed on Dec. 14, 2021, the entire contents of which are incorporated herein by reference.

FIELD

Embodiments described herein relate to a merchandise processing device and a method therefor.

BACKGROUND

In a retail store, such as a supermarket, that sells fresh food, it is widely practiced that a store clerk applies a discount seal to a merchandise that is about to expire and gives a discount, thereby reducing waste loss caused by unsold merchandises. Accordingly, there is a merchandise processing device that recognizes information of the discount seal based on a captured image of the merchandise and automatically gives a discount on the merchandise based on the information of the discount seal. When this type of merchandise processing device is used in a full self-service manner by a customer from merchandise registration to payment, there is a concern about an illegal action of misappropriating discount seals.

DESCRIPTION OF THE DRAWINGS

FIG. 5 is a schematic diagram showing a layout example of a registration screen displayed on a touch panel;

FIG. 9 is a diagram showing an example of a registration screen after update; and FIG. 10 is a diagram showing another example of the registration screen after update.

DETAILED DESCRIPTION

In general, according to one embodiment, a merchandise processing device that prevents an illegal action of misappropriating discount seals is provided.

In one embodiment, a merchandise processing device includes an identification means, a detection means, and a control means. The identification means identifies a merchandise. The detection means detects, based on a captured image of the merchandise, a privilege medium in which privilege information is recorded. The control means causes a display device to display the image, on which the privilege medium is detected, in association with information related to the merchandise identified by the identification means.

Hereinafter, an embodiment of a merchandise processing device will be described with reference to the drawings.

In the present embodiment, a full self-service point of sales (POS) terminal used in a full self-service payment system introduced in a supermarket or the like is an example of the merchandise processing device.

[Schematic Description of Payment System]

Figure 1:
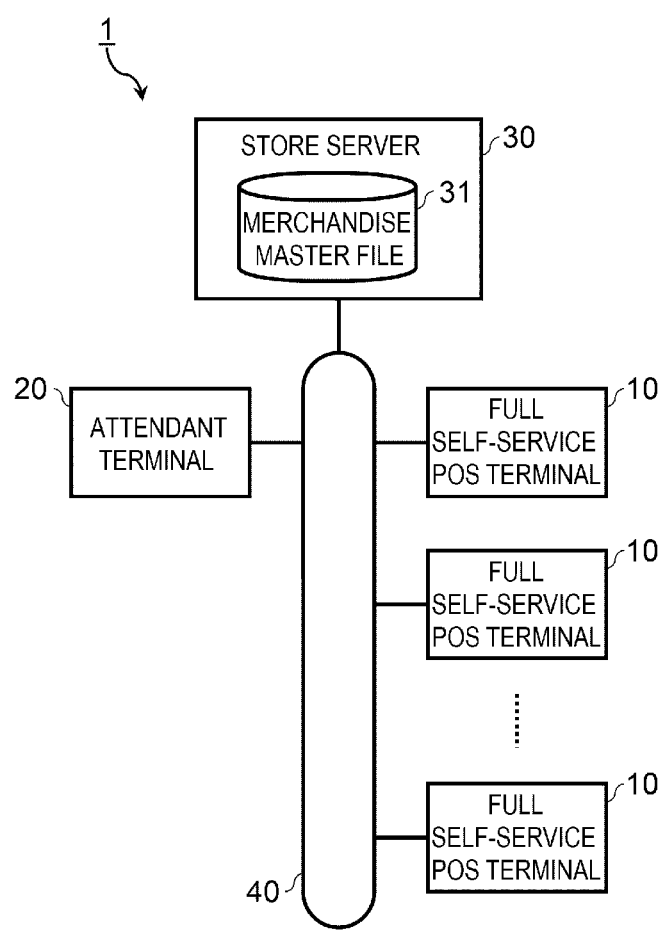
FIG. 1 is a schematic configuration diagram of a payment system using full self-service POS terminals.

FIG. 1 is a schematic configuration diagram of a payment system 1 using full self-service POS terminals 10. The payment system 1 includes a plurality of full self-service POS terminals 10, an attendant terminal 20, a store server 30, and a communication network 40. The communication network 40 is, for example, a local area network (LAN). In the payment system 1, the plurality of full self-service POS terminals 10, the attendant terminal and the store server 30 are connected to the communication network 40 to construct a system.

Each of the full self-service POS terminals 10 is installed in a payment area prepared separately from a sales area where merchandises are displayed. A customer who finishes shopping in the sales area goes to the payment area and operates an unoccupied full self-service POS terminal to register and pay for, in a self-service manner, purchased merchandises.

The attendant terminal 20 is installed in the vicinity of an exit of the payment area. The attendant terminal 20 is a terminal for monitoring by a store clerk called an attendant. The attendant terminal 20 includes a monitor screen, and images indicating states of the respective full self-service POS terminals 10 are appropriately displayed on the screen. The number of the attendant terminal 20 is not limited to one. The plurality of full self-service POS terminals 10 may be divided into two or more groups, and the attendant terminal 20 may be provided for the group.

The store server 30 is a server computer that provides various services as a host device of the full self-service POS terminals 10 and the attendant terminal 20. The store server 30 may be physically installed in a store, or may be virtually installed, as a cloud server, on a network such as the Internet.

The store server 30 manages a merchandise master file 31. The merchandise master file 31 is a collection of merchandise records created for a merchandise. The merchandise record is a data record in which merchandise related data, such as a merchandise code, a merchandise name, a classification code, and a unit price, is described. The merchandise code is a unique code set for a merchandise in order to individually identify the merchandise. Usually, a merchandise is attached with a barcode symbol that represents the merchandise code unique to the merchandise.

[Description of Configuration of Full Self-Service POS Terminal]

Figure 2:
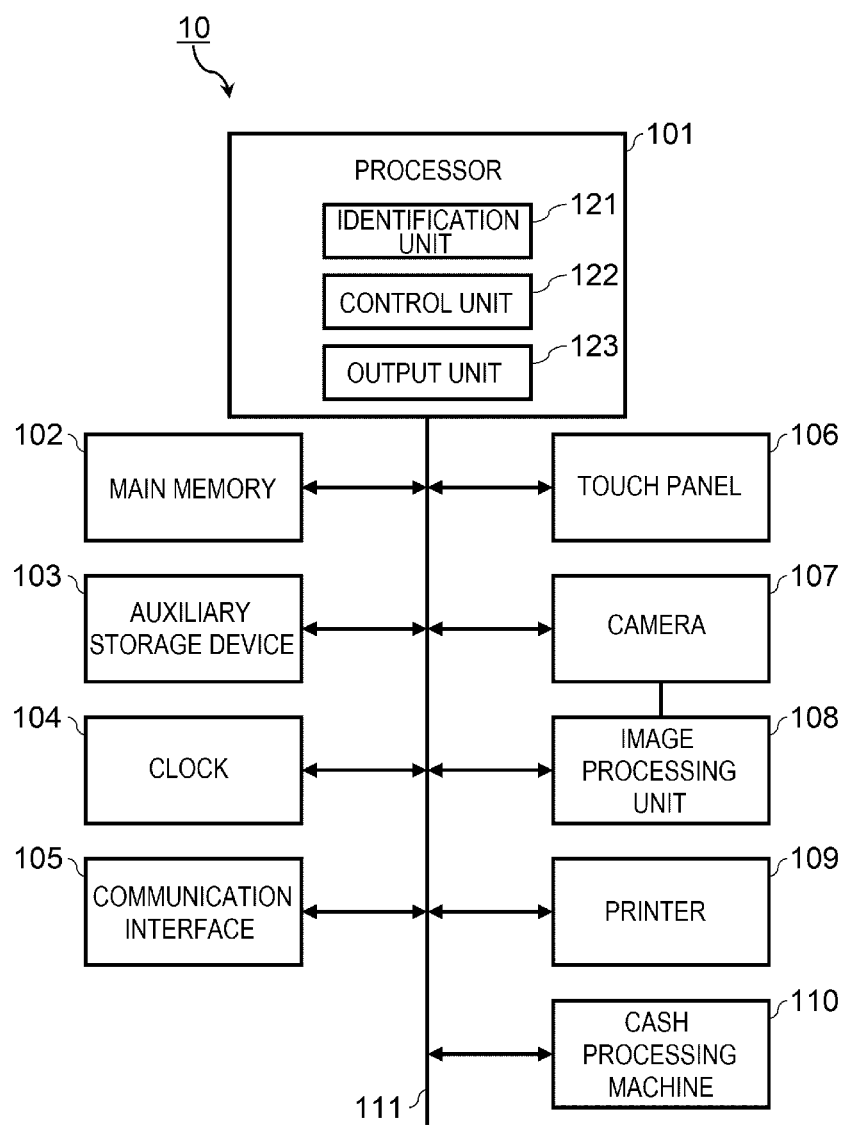
FIG. 2 is a block diagram showing a main circuit configuration of the full self-service POS terminal.

FIG. 2 is a block diagram showing a main circuit configuration of the full self-service POS terminal 10. The full self-service POS terminal 10 includes a processor 101, a main memory 102, an auxiliary storage device 103, a clock 104, a communication interface 105, a touch panel 106, a camera 107, an image processing unit 108, a printer 109, a cash processing machine 110, a system transmission path 111, and the like. The system transmission path 111 includes an address bus, a data bus, a control signal line, and the like.

The system transmission path 111 directly connects the processor 101 and other units or connects the processor 101 and other units via a signal input and output circuit, and transmits data signals exchanged between the processor 101 and other units.

In the full self-service POS terminal 10, a computer is implemented by connecting the processor 101, the main memory 102, the auxiliary storage device 103, the clock 104, and the communication interface 105 via the system transmission path 111. Then, in the full self-service POS terminal 10, the image processing unit 108, the cash processing machine 110 and devices such as the touch panel 106, the camera 107, and the printer 109 are connected to the computer via the system transmission path 111. The device connected to the system transmission path 111 is not limited to the devices described above. For example, various devices related to a POS terminal, such as a keyboard, a display, and a hand scanner, may be connected.

The processor 101 corresponds to a central part of the computer. The processor 101 controls, according to an operating system or an application program, the units to implement various functions as the full self-service POS terminal 10. The processor 101 is, for example, a central processing unit (CPU).

The main memory 102 corresponds to a main memory part of the computer. The main memory 102 includes a non-volatile memory area and a volatile memory area. The main memory 102 stores an operating system or an application program in the non-volatile memory area. The main memory 102 may store, in the non-volatile or volatile memory area, data necessary for the processor 101 to execute processing for controlling the units. The volatile memory area of the main memory 102 is used as a work area in which data is appropriately rewritten by the processor 101. The non-volatile memory area is, for example, a read only memory (ROM). The volatile memory area is, for example, a random access memory (RAM).

The auxiliary storage device 103 corresponds to an auxiliary storage part of the computer. For example, an electric erasable programmable read-only memory (EEPROM), a hard disk drive (HDD), a solid state drive (SSD), or the like may serve as the auxiliary storage device 103. The auxiliary storage device 103 stores data to be used when the processor 101 performs various types of processing, data created by the processor 101 in the processing, and the like. The auxiliary storage device 103 may store the application program described above.

The clock 104 clocks date and time. The processor 101 processes the date and time clocked by the clock 104 as current date and time.

The communication interface 105 controls data communication with external devices such as the store server and the attendant terminal 20 connected via the communication network 40.

The touch panel 106 is a device including both an input device and a display device. The touch panel 106 displays information to a customer who is an operator of the full self-service POS terminal 10, and receives an operation input by the customer.

The camera 107 is an imaging device for capturing an image of a merchandise held over a reading window. Images captured by the camera 107 are sequentially transmitted to the image processing unit 108 and processed thereby.

Figure 3:
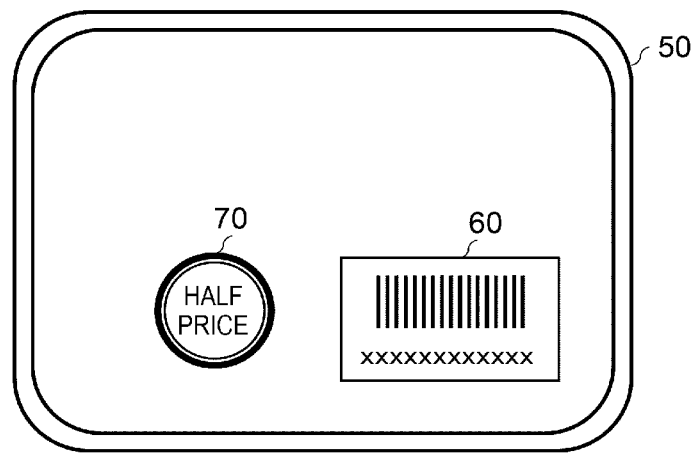
FIG. 3 is a schematic diagram showing an appearance of a discount target merchandise.

FIG. 3 is a schematic diagram showing an appearance of a discount target merchandise 50. As shown in FIG. 3, a discount seal 70 is attached to the discount target merchandise 50 separately from a barcode 60. The barcode may be printed on a package of the discount target merchandise 50, or may be printed on a price label and attached to the discount target merchandise 50. The discount seal 70 is attached by an employee to, for example, a discount target merchandise that is about to expire at a position of the merchandise where the discount seal 70 does not overlap the barcode 60. The discount seal 70 may be attached to the same surface as the barcode 60, or may be attached to a different surface.

The image processing unit 108 processes an image captured by the camera 107 to detect the barcode 60. Further, the image processing unit 108 processes an image captured by the camera 107 to detect the discount seal 70. A technique for detecting the barcode 60 or the discount seal based on an image is well known, and thus a description thereof will be omitted here. When the barcode 60 is detected, the image processing unit 108 outputs a barcode detection signal to the processor 101. When the discount seal 70 is detected, the image processing unit 108 outputs a discount seal detection signal to the processor 101.

Information related to a discount is written on the discount seal 70. The processor 101 reduces a price of a merchandise based on the information related to the discount. For example, when the discount seal 70 on which "half price" is written is detected, the processor 101 reduces the price of the merchandise by half. For example, when the discount seal 70 on which "10 yen discount" is written is detected, the processor 101 reduces the price of the merchandise by yen. For example, when the discount seal 70 on which "5% discount" is written is detected, the processor 101 reduces the price of the merchandise by 5%. The discount seal 70 is a type of privilege medium. Here, the image processing unit 108 functions as a detection unit that detects a privilege medium, in which privilege information is recorded, based on a captured image of a merchandise.

The printer 109 issues a receipt by printing various character strings, images, or the like on a receipt paper. As this type of printer 109, for example, a thermal printer, a dot impact printer, or the like can be used.

The cash processing machine 110 processes cash. The cash processing machine 110 has a bill insertion slot, a bill discharge slot, a coin insertion slot, and a coin discharge slot. The cash processing machine 110 processes bills inserted into the bill insertion slot. The cash processing machine discharges bills as change from the bill discharge slot. The cash processing machine receives and processes coins inserted into the coin insertion slot. The cash processing machine discharges coins as change from the coin discharge slot.

In the full self-service POS terminal 10 having such a configuration, the processor 101 has functions as an identification unit 121, a control unit 122, and an output unit 123.

The identification unit 121 is a function of identifying a merchandise. For example, the identification unit 121 identifies a merchandise by acquiring the merchandise code based on information of the barcode 60 detected by the image processing unit 108. The identification unit 121 may identify a merchandise by acquiring the merchandise code of the merchandise selected from a list of merchandises without barcode displayed on the touch panel 106. The identification unit 121 can also identify a merchandise by other methods.

The control unit 122 has a function of causing the display device to display an image, in which the discount seal 70 which is a privilege medium is detected by the image processing unit 108, in association with information related to the merchandise identified by the identification unit 121.

The display device is typically the touch panel 106. The control unit 122 may display the image in which the discount seal 70 is detected on a display device other than the touch panel 106.

The output unit 123 has a function of outputting information displayed on the display device to a monitoring terminal. The monitoring terminal is typically the attendant terminal 20.

The function of the image processing unit 108 and the functions of the processor 101 as the identification unit 121, the control unit 122, and the output unit 123 are all implemented according to a merchandise processing program. The merchandise processing program is a type of application program stored in the main memory 102 or the auxiliary storage device 103. A method of installing the merchandise processing program in the main memory 102 or the auxiliary storage device 103 is not particularly limited. The merchandise processing program can be recorded on a removable recording medium, or the merchandise processing program can be distributed by communication via a communication network and installed in the main memory 102 or the auxiliary storage device 103. A form of the recording medium is not limited as long as the recording medium can store programs and can be read by devices, such as a CD-ROM and a memory card.

Figure 4:
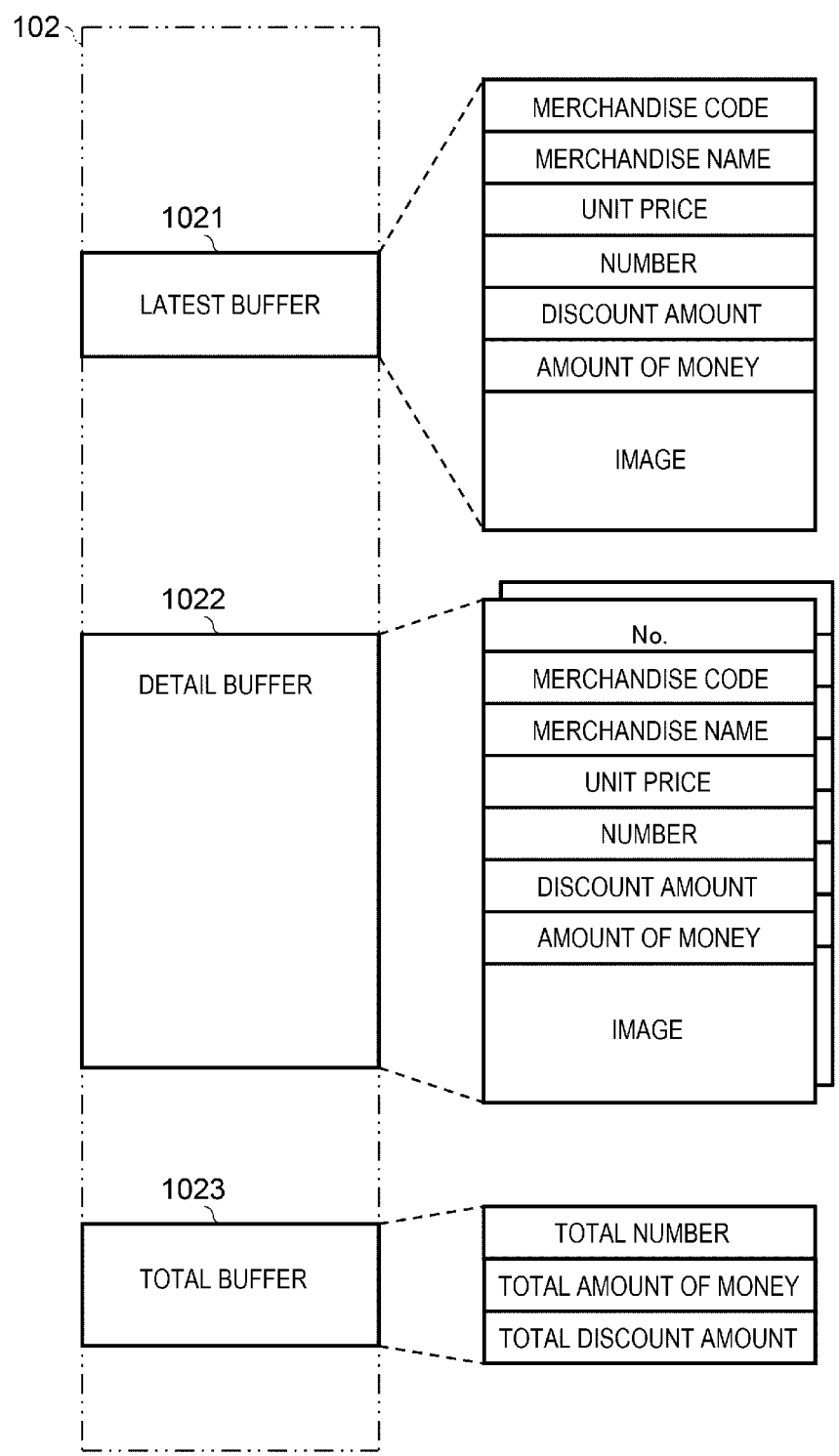
FIG. 4 is a schematic diagram showing a main memory area formed in a main memory of the full self-service POS terminal.

FIG. 4 is a schematic diagram showing a main memory area formed in the main memory 102 of the full self-service POS terminal 10. The main memory 102 includes, in particular, a latest buffer 1021, a detail buffer 1022, and a total buffer 1023.

The latest buffer 1021 is an area for storing at least the merchandise code, the merchandise name, the unit price, the number, a discount amount, an amount of money, and an image of a latest registered merchandise.

The detail buffer 1022 is an area for storing the merchandise codes, the merchandise names, the unit prices, the number, the discount amounts, the amounts of money, and the images of merchandises registered before the latest registered merchandise in association with serial numbers (No.) from "1".

The total buffer 1023 is an area for storing a total number and a total amount of money of registered merchandises.

FIG. 5 is a schematic diagram showing a layout example of a registration screen 80 displayed on the touch panel 106. As shown in FIG. 5, the registration screen 80 includes a latest display part 81 and a detail display part 82. The registration screen 80 also displays a payment button 83. A button image displayed on the registration screen 80 is not limited to the payment button 83. A button image having another function may also be displayed.

The latest display part 81 is an area for displaying the merchandise name, the unit price, the number, and the amount of money of the latest registered merchandise, and the total number and the total amount of money of all the registered merchandises. When there is a discount for the latest registered merchandise, an image related to the discount is displayed together with the discount amount. That is, the latest display part 81 is an area for displaying data stored in the latest buffer 1021 and data stored in the total buffer 1023.

The detail display part 82 is an area for displaying the merchandise names, the numbers, the unit prices, the discount amounts, the images, and the amounts of money of the merchandises registered before the latest registered merchandise in a list form in association with the serial numbers in the registration order. That is, the detail display part 82 is an area for displaying data stored in the detail buffer 1022.

The payment button 83 is an operator for instructing a customer to complete the registration of the merchandise and shift to the payment of the merchandise. That is, the customer who completes the registration of purchased merchandises by operating the full self-service POS terminal can shift to a payment operation by touching the payment button 83.

[Description of Operation of Full Self-Service POS Terminal]

Figure 6:
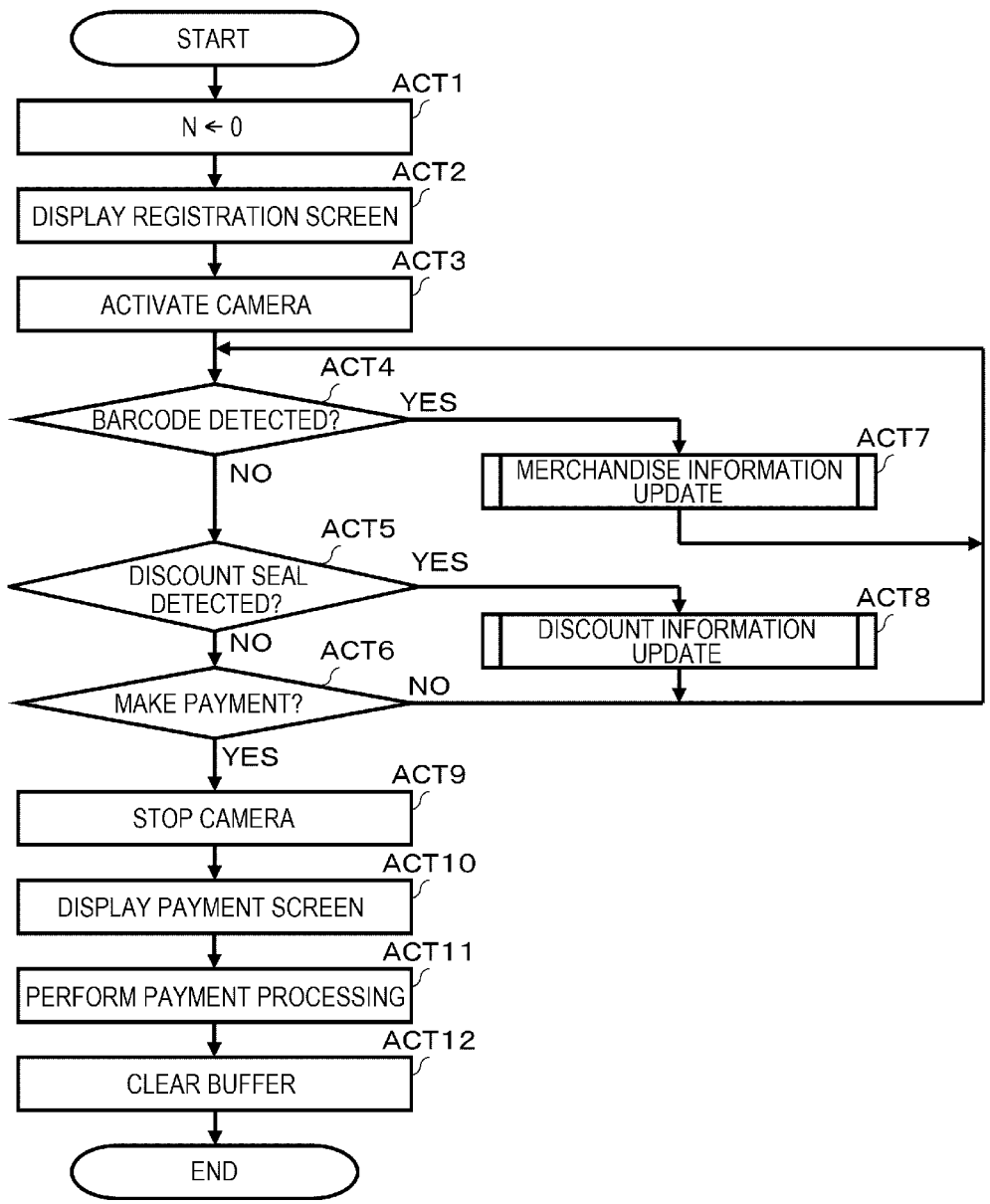
FIG. 6 is a flowchart showing a main procedure of main information processing to be executed by a processor according to a merchandise processing program.
Figure 7:
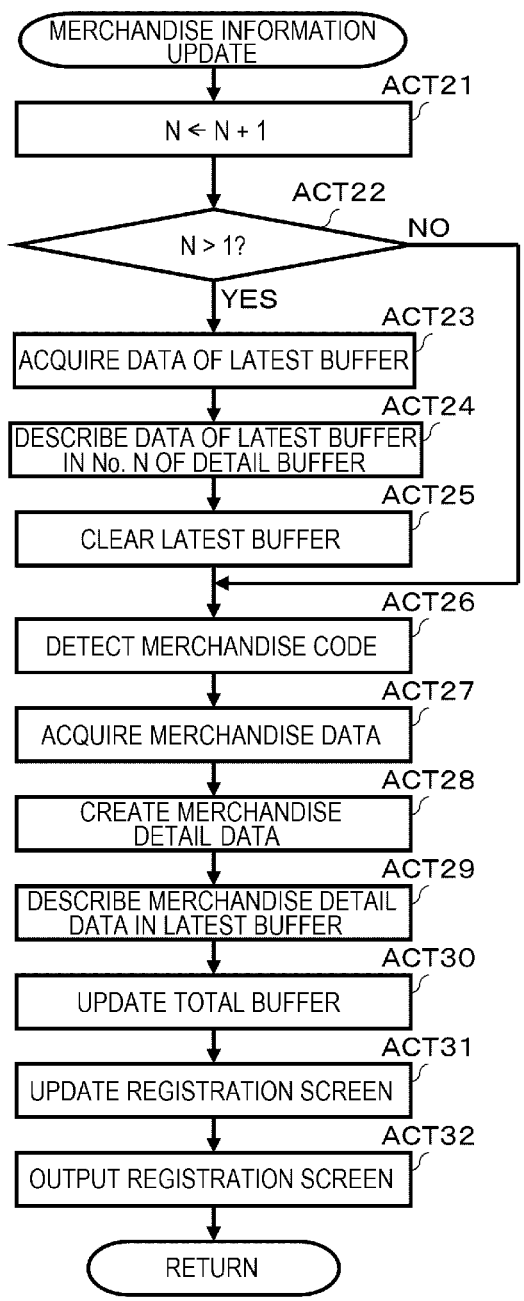
FIG. 7 is a flowchart showing a specific procedure of merchandise information update in FIG. 6.
Figure 8:
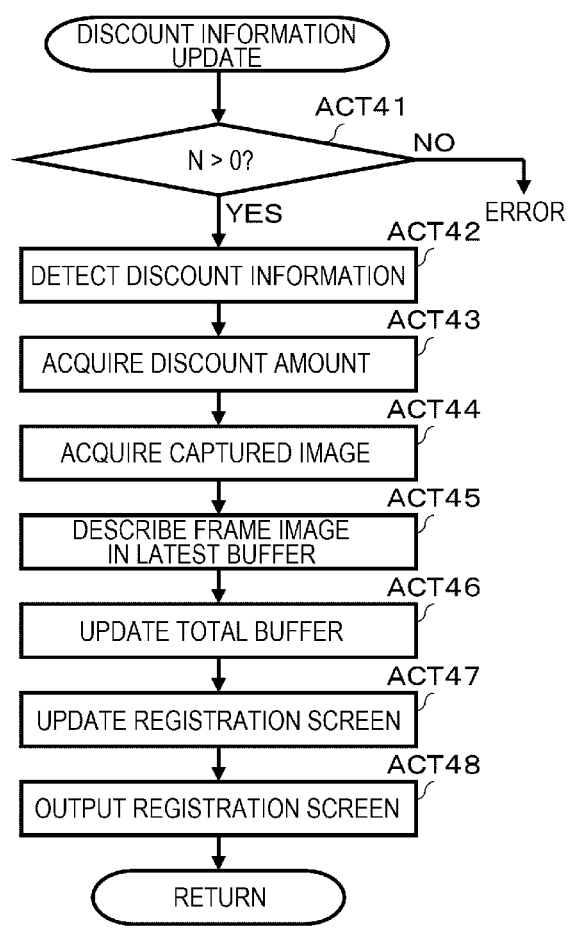
FIG. 8 is a flowchart showing a specific procedure of discount information update in FIG. 6.
Figure 9:
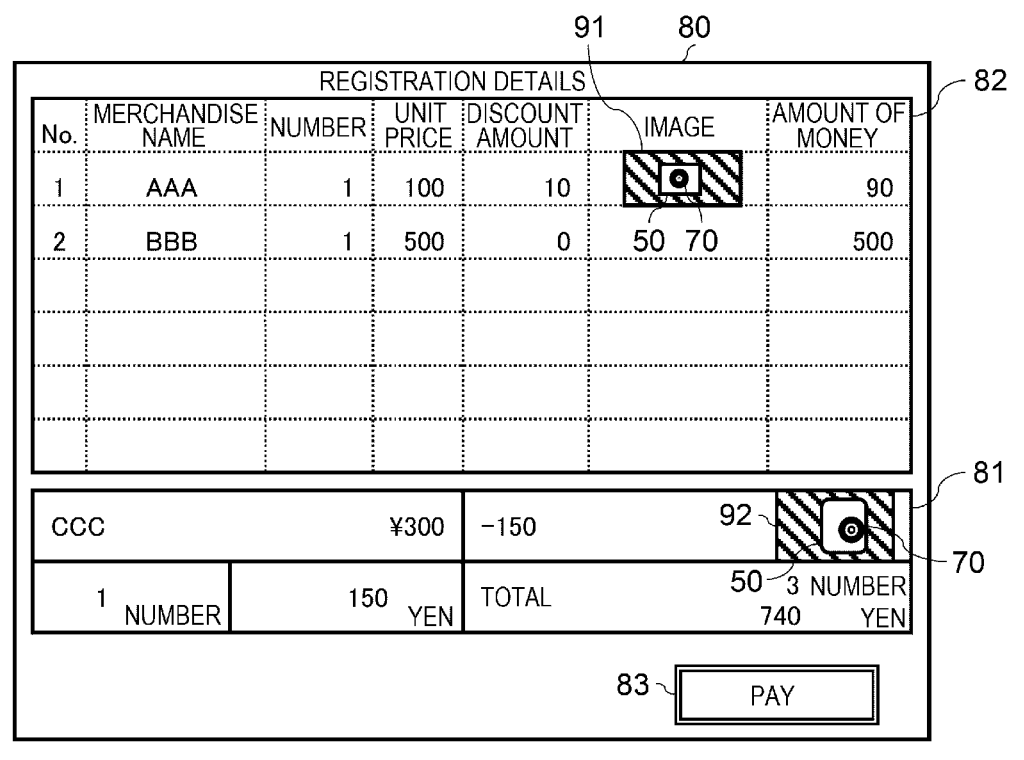

FIGS. 6 to 8 are flowcharts showing main procedures of information processing to be executed by the processor 101 according to the merchandise processing program. FIG. 9 is an example of the registration screen 80 that transitions during the information processing. Hereinafter, a main operation of the full self-service POS terminal 10 will be described with reference to the drawings. The operation described below is an example. As long as the same effect can be obtained, the procedure or the content of the processing can be appropriately changed. The layout of the screen, the image, a text, and the like are not limited to those shown in the drawings.

For example, a customer who finishes shopping in the sales area stands in front of the full self-service POS terminal 10 and touches the touch panel 106. Then, the merchandise processing program is started up, and the processor 101 starts the information processing of the procedure shown in the flowchart of FIG. 6.

First, in ACT 1, the processor 101 resets a counter N of the number of registered items to "0". The counter N of the number of registered items is built in, for example, the processor 101. The counter N of the number of registered items may be formed in the volatile area of the main memory 102.

Next, in ACT 2, the processor 101 displays the registration screen 80 on the touch panel 106. At this time, the latest buffer 1021, the detail buffer 1022, and the total buffer 1023 are all cleared. Therefore, as shown in FIG. 5, the touch panel 106 displays the registration screen in which information related to the merchandise, such as the merchandise name, the number, and the unit price, is blank. In ACT 3, the processor 101 that controls the display of the registration screen 80 activates the camera 107.

A customer who confirms the registration screen 80 holds the barcode 60 attached to a purchased merchandise 50 over the reading window in order to self-register the purchased merchandise 50. The camera 107 captures an image of the barcode 60 held over the reading window. At this time, the camera 107 captures not only the barcode 60 but also a merchandise package around the barcode 60. The image processing unit 108 detects the barcode 60 based on the image captured by the camera 107. When the barcode 60 is detected, the image processing unit 108 outputs a barcode detection signal to the processor 101.

When the discount seal 70 is attached to the purchased merchandise 50, the customer holds the discount seal 70 over the reading window. The camera 107 captures an image of the discount seal 70 held over the reading window. At this time, the camera 107 captures not only the discount seal 70 but also a merchandise package around the discount seal 70. The image processing unit 108 detects the discount seal 70 based on the image captured by the camera 107. When the discount seal 70 is detected, the image processing unit 108 outputs a discount seal detection signal to the processor 101.

In ACT 4, the processor 101 that activates the camera 107 confirms whether or not the barcode detection signal is received. If the barcode detection signal is not received, the processor 101 proceeds to ACT 5. In ACT 5, the processor 101 confirms whether or not the discount seal detection signal is received. If the discount seal detection signal is not received, the processor 101 proceeds to ACT 6. In ACT 6, the processor 101 confirms whether or not a payment signal is received. The payment signal is a signal output from the touch panel 106 to the processor 101 when the touch panel 106 detects that the payment button 83 is touched. If the payment signal is not received, the processor 101 returns to ACT 4. Here, in ACT 4 to ACT 6, the processor 101 waits to receive the barcode detection signal, the discount seal detection signal, or the payment signal.

If the barcode detection signal is received in a standby state of ACT 4 to ACT 6, the processor 101 proceeds to ACT 7. In ACT 7, the processor 101 updates the merchandise information. Details of the merchandise information update will be described later. When the processor 101 completes the merchandise information update, the processor 101 returns to the standby state of ACT 4 to ACT 6.

If the discount seal detection signal is received in the standby state of ACT 4 to ACT 6, the processor 101 proceeds to ACT 8. In ACT 8, the processor 101 updates the discount information. Details of the discount information update will be described later. When the processor 101 completes the discount information update, the processor 101 returns to the standby state of ACT 4 to ACT 6.

When a customer completes the self-registration of all the purchased merchandises 50, the customer touches the payment button 83. When the payment button 83 is touched, the payment signal is input from the touch panel 106 to the processor 101. If the payment signal is received in the standby state of ACT 4 to ACT 6, the processor 101 proceeds to ACT 9. In ACT 9, the processor 101 stops the camera 107. Next, in ACT 10, the processor 101 switches the screen of the touch panel 106 from the registration screen 80 to a payment screen. The payment screen is a screen for accepting a payment by a payment method such as cash, a credit card, or electronic money. For example, in the case of cash payment, a screen for displaying an amount of deposit, an amount of change, and the like is the payment screen.

In ACT 11, the processor 101 that controls the display of the payment screen executes payment processing. For example, in the case of cash payment, the processor 101 calculates an amount of change by subtracting the total amount of money of a transaction from an amount of deposit inserted into the cash processing machine 110, and displays the amount of deposit and the amount of change on the payment screen. The processor 101 controls the printer 109 to print and issue a detail receipt of the purchased merchandises.

When the processor 101 completes the payment processing, the processor 101 proceeds to ACT 12. In ACT 12, the processor 101 clears the latest buffer 1021, the detail buffer 1022, and the total buffer 1023. As described above, the processor 101 completes the processing of the merchandise processing program for one customer.

FIG. 7 is a flowchart showing a specific procedure of the merchandise information update.

When the merchandise information update is started, in ACT 21, the processor 101 counts up the counter N of the number of registered items by "1". Then, in ACT 22, the processor 101 confirms whether or not the value of the counter N of the number of registered items is larger than "1".

When a first purchased merchandise is registered, the counter N of the number of registered items is "1". At this time, both the latest buffer 1021 and the detail buffer 1022 are cleared. On the other hand, when second and subsequent purchased merchandises are registered, the counter N of the number of registered items is equal to or larger than "2". At this time, at least in the latest buffer 1021, the merchandise code, the merchandise name, the unit price, the number, and the like related to the immediately previously registered merchandise are described.

If the counter N of the number of registered items is "1", the processor 101 proceeds from ACT 22 to ACT 26. That is, the processor 101 skips the processing in ACT 23, ACT 24, and ACT 25.

If the counter N of the number of registered items is larger than "1", the processor 101 proceeds from ACT 22 to ACT 23. In ACT 23, the processor 101 acquires data of the latest buffer 1021. Then, in ACT 24, the processor 101 adds a count value of the counter N of the number of registered items to the data of the latest buffer 1021 and describes the data of the latest buffer 1021 in the detail buffer 1022. In ACT 25, the processor 101 clears the latest buffer 1021. Thereafter, the processor 101 proceeds to ACT 26.

As described above, when the first purchased merchandise is registered, the processor 101 skips the processing of ACT 23 to ACT 25 and proceeds to ACT 26. When the second and subsequent purchased merchandises are registered, the processor 101 proceeds to ACT 26 after executing the processing of ACT 23 to ACT 25 each time.

In ACT 26, the processor 101 detects a merchandise code from a barcode detected by the image processing unit 108. In ACT 27, the processor 101 acquires merchandise data such as the merchandise name and the unit price stored in the merchandise master file 31 in association with the merchandise code. In ACT 28, the processor 101 creates merchandise detail data including the merchandise code, the merchandise name, the unit price, the number, and the amount of money. The number is "1" when there is no multiplication registration, and is a multiplier of 1 when there is multiplication registration. The amount of money is an amount of money calculated by multiplying the unit price by the number.

In ACT 29, the processor 101 describes the merchandise detail data in the latest buffer 1021. At this time, the discount amount is "0". An image is also not included. In ACT 30, the processor 101 updates the total buffer 1023. That is, the processor 101 adds the number in merchandise sales data to the total number in the total buffer 1023. Further, the processor 101 adds an amount of money in the merchandise sales data to the total amount of money in the total buffer 1023.

In ACT 31, the processor 101 updates the registration screen 80. Specifically, the processor 101 causes the latest display part 81 to display the merchandise name, the unit price, the number, and the amount of money in the latest buffer 1021 and the total number and the total amount of money in the total buffer 1023. Further, the processor 101 displays the merchandise name, the unit price, the number, and the amount of money in the detail buffer 1022 on the detail display part 82 in the order of a series of numbers.

When the processor 101 completes the update of the registration screen 80, in ACT 32, the processor 101 controls the communication interface 105 to output information of the registration screen 80 to the attendant terminal 20. By this control, the information of the registration screen 80 is transmitted to the attendant terminal 20. As a result, the same information as the registration screen 80 is displayed on a monitoring monitor of the attendant terminal 20.

As described above, the processor 101 exits the merchandise information update.

FIG. 8 is a flowchart showing a specific procedure of the discount information update.

When the discount information update is started, in ACT 41, the processor 101 confirms whether or not the counter N of the number of registered items is a value larger than "0". When the discount information update is started without updating the merchandise information, the counter N of the number of registered items is "0". That is, since there is an operation error that the discount seal is read without identifying the purchased merchandise, the processor 101 completes the discount information update as an error.

If the counter N of the number of registered items is larger than "0", the processor 101 proceeds to ACT 42. In ACT 42, the processor 101 detects discount information described in the discount seal 70. Then, in ACT 43, the processor 101 calculates the discount amount based on the discount information. For example, when the discount information is half price and the unit price of an identified merchandise is 100 yen, the discount amount is 50 yen which is half the price of 100 yen. For example, when the discount information is 10 yen discount and the unit price of an identified merchandise is equal to or higher than the discount amount, the discount amount is 10 yen. For example, when the discount information is 5% discount and the unit price of an identified merchandise is 100 yen, the discount amount is 5 yen.

After acquiring the discount amount, the processor 101 acquires an image of the discount seal 70 from the image processing unit 108. In the image processing unit 108, frame images captured by the camera 107 are stored in time series. The processor 101 grasps a frame time of an image in which the discount seal is detected. The processor 101 acquires a frame image having the same frame time from the image processing unit 108.

When the processor 101 completes acquiring the captured image, in ACT 45, the processor 101 describes the frame image in the latest buffer 1021. In ACT 46, the processor 101 subtracts the discount amount from the total amount of money in the total buffer 1023.

In ACT 47, the processor 101 updates the registration screen 80. Specifically, the processor 101 causes the latest display part 81 to display the discount amount and the image described in the latest buffer 1021. Further, the processor 101 changes the total amount of money on the latest display part 81 so as to match the total amount of money in the total buffer 1023.

When the processor 101 completes the update of the registration screen 80, in ACT 48, the processor 101 controls the communication interface 105 to output the information of the registration screen 80 to the attendant terminal 20. By this control, the information of the updated registration screen 80 is transmitted to the attendant terminal 20. As a result, the same information as the registration screen 80 is displayed on the monitoring monitor of the attendant terminal 20. That is, the discount amount and the image are displayed.

As described above, the processor 101 exits the discount information update.

Here, the processor 101 implements the function as the identification unit 121 by ACT 26 to ACT 29 of FIG. 7. The processor 101 implements the function as the control unit 122 by ACT 44 to ACT 47 of FIG. 8. The processor 101 implements the function as the output unit 123 by the ACT 48 of FIG. 8.

[Description of Effects of Full Self-Service POS Terminal]

FIG. 9 is an example of the registration screen 80 when three purchased merchandises including a purchased merchandise AAA having a unit price of 100 yen, a purchased merchandise BBB having a unit price of 500 yen, and a purchased merchandise CCC having a unit price of 300 yen are registered. A discount seal 70 for 10 yen discount is attached to the purchased merchandise AAA. A half price discount seal is attached to the purchased merchandise CCC. In this case, a customer first holds the barcode of the purchased merchandise AAA over the reading window. Then, the customer holds the discount seal 70 for 10 yen discount over the reading window. Next, the customer holds the barcode of the purchased merchandise BBB over the reading window. Since the discount seal 70 is not attached to the purchased merchandise BBB, the customer does not hold the discount seal over the reading window. Next, the customer holds the barcode of the purchased merchandise CCC over the reading window. Next, the customer holds the half price discount seal 70 over the reading window.

When the full self-service POS terminal 10 is operated in the above procedure, an image 91 when the discount seal 70 indicating 10 yen discount is captured is displayed in a row of No. 1 in the detail display part 82 together with the number "1", the unit price "100", the discount amount "10", and the amount of money "90" after the discount of the purchased merchandise AAA. In the image 91, a merchandise package around the discount seal 70 is also displayed together with the discount seal 70. Therefore, the customer can recognize that the purchased merchandise AAA is correctly discounted based on the discount seal 70.

The number "1", the unit price "500", the discount amount "0", and the amount of money "500" of the purchased merchandise CCC are displayed in a row of No. 2 in the detail display part 82. Nothing is displayed in an image column. Therefore, the customer can recognize that the purchased merchandise BBB is registered without discount.

Meanwhile, in addition to the unit price "300" and the number "1" of the purchased merchandise CCC, the latest display part 81 displays an image 92, captured when the half price discount seal 70 is imaged, together with the amount of money "150" after the discount and the discount amount "150" of the purchased merchandise CCC. In the image 92, a merchandise package around the discount seal 70 is also displayed together with the discount seal 70. Therefore, the customer can recognize that the purchased merchandise CCC is correctly discounted based on the discount seal 70.

However, it is assumed that after the customer registers the purchased merchandise BBB, the customer holds the half price discount seal 70 over the reading window before registering the purchased merchandise CCC. In this case, as shown in FIG. 10, the latest display part 81 displays the image 92 of the discount seal 70 together with the unit price, the number, and the like of the purchased merchandise BBB. Therefore, the customer can know that the order of operation on the discount seal 70 is incorrect and the purchased merchandise BBB is discounted instead of the purchased merchandise CCC. Incidentally, in this case, by performing a predetermined cancellation operation, the full self-service POS terminal 10 can be returned to the state before the discount seal 70 is read.

A customer may try to illegally misappropriate the discount seal 70. For example, if the discount seal 70 is a half price discount seal, the discount amount is maximized by applying the discount seal 70 to a merchandise having the highest unit price. In the above example, the merchandise having the highest unit price is the purchased merchandise BBB. Therefore, after the customer registers the purchased merchandise BBB, the customer may intentionally hold the half price discount seal 70 to the reading window before registering the purchased merchandise CCC.

However, in this case, as shown in FIG. 10, the image 92 of the discount seal 70 attached to the purchased merchandise CCC is displayed on the latest display part 81 together with the unit price, the number, and the like of the purchased merchandise BBB. Therefore, it is obvious from the information on the latest display part 81 that the purchased merchandise CCC to which the discount seal 70 is attached does not match the purchased merchandise BBB to be discounted based on the discount seal 70. That is, it is difficult for the customer to perform an illegal action of misappropriating the discount seal 70, and an effect of preventing the illegal action is fully exerted.

In addition, on the attendant terminal 20, an image having the same content as the registration screen 80 displayed on the touch panel 106 of the full self-service POS terminal 10 is displayed substantially in real time. Therefore, an attendant who is a monitoring person of the attendant terminal 20 can easily find the illegal misappropriation of the discount seal 70. From this point of view, the monitoring also significantly improves the effect of preventing illegal misappropriation of the discount seal 70.

Illegal misappropriation such as attaching the discount seal 70 to another merchandise may be performed. In this case, an image of a merchandise to which the discount seal 70 is attached matches a merchandise registered immediately before that merchandise. However, since the image of the merchandise to which the discount seal 70 is attached is displayed on the touch panel 106, the customer may consider that, for example, the attendant may find the illegal action that the discount seal 70 is attached to another merchandise. Therefore, from this point, it can also be said that there is an effect of preventing illegal misappropriation of the discount seal 70.

In general, the information displayed on the registration screen 80 is left in the auxiliary storage device 103 as journal data. Therefore, by analyzing the journal data, the illegal misappropriation of the discount seal 70 can be easily found.

MODIFICATION

The merchandise processing device is not limited to the full self-service POS terminal 10 that allows a customer to register purchased merchandises in a self-service manner. For example, in a store that rents out a recording medium in which content such as music or a movie is recorded, a rental merchandise may be rented by being attached with a privilege medium that clearly indicates a discount on a rental fee or an extension of a rental period. An example of the merchandise processing device may be such a terminal that allows self-registration at the time of rental of a rental merchandise.

In the above embodiment, the image processing unit 108 is described as a function different from those of the processor 101. In this regard, the image processing unit 108 may be provided as a function of the processor 101.

The privilege medium is not limited to the discount seal. For example, a magnification change seal or the like that clearly indicates that the magnification of a service point is changed to double or the like may be used.

While certain embodiments have been described, these embodiments have been presented as examples, and are not intended to limit the scope of the inventions. These novel embodiments can be implemented in various other forms, and various omissions, substitutions, and changes can be made without departing from the spirit of the inventions. These embodiments and modifications thereof are included in the scope of the inventions, and are also included in the inventions described in the scope of the claims and an equivalent scope thereof.

What is claimed is:

1. A merchandise processing device, comprising:
a camera that captures an image of merchandise associated with a barcode and a discount seal; and
a processor configured to:
process the image of merchandise captured by the camera to detect the barcode and identify the merchandise based on the barcode;
process the image of merchandise captured by the camera to detect the discount seal that represents discount information;
based on a price of the merchandise and the discount information, calculate a discount amount associated with the merchandise;
cause a display device of a point of sale terminal to display the image contiguously associated with the discount amount in association with related information associated with the merchandise; and
prevent illegal misappropriation of the discount seal based on the processor being further configured to facilitate output, at another display device of an attendant terminal, the image displayed on the point of sale terminal in real time.

2. The merchandise processing device according to claim 1, wherein
the display device includes a latest display part configured to display information related to a most recently identified merchandise, and
the processor is further configured to:
store related information associated with a first merchandise in a first buffer, store related information associated with the first merchandise from the first buffer to a second buffer when a second merchandise is identified, and store related information associated with the second merchandise in the first buffer,
cause display the image contiguously associated with the discount amount in association with related information associated with the merchandise stored the first buffer, and
cause display related information associated with the merchandise stored the second buffer in a list form.

3. The merchandise processing device according to claim 1, wherein the processor is further configured to:
output information displayed on the display device to a monitoring terminal.

4. The merchandise processing device according to claim 1, wherein the processor is configured to:
first identify the barcode and then identify the discount seal associated with the barcode.

5. A method for causing a computer of a merchandise processing device to perform functions including:
capturing an image of merchandise associated with a barcode and a discount seal;
processing the image of merchandise captured to detect the barcode and identify the merchandise based on the barcode;
processing the image of merchandise to detect the discount seal that represents discount information;
based on a price of the merchandise and the discount information, calculating a discount amount associated with the merchandise;
displaying the image contiguously associated with the discount amount in association with related information associated with the merchandise; and
preventing illegal misappropriation of the discount seal, the preventing comprises facilitating output, at another display device of an attendant terminal, the image displayed on the merchandise processing device in real time.

6. The method according to claim 5, further comprising:
displaying information related to a most recently identified merchandise;
storing related information associated with a first merchandise in a first buffer, storing related information associated with the first merchandise from the first buffer to a second buffer when a second merchandise is identified, and storing related information associated with the second merchandise in the first buffer;
displaying the image contiguously associated with the discount amount in association with related information associated with the merchandise stored the first buffer; and
displaying related information associated with the merchandise stored the second buffer in a list form.

7. The method according to claim 5, further comprising:
outputting information displayed to a monitoring terminal.

8. The method according to claim 5, further comprising:
first identifying the barcode and then identifying the discount seal associated with the barcode.

9. A point-of-sale (POS) terminal, comprising:
a settlement processing component; and
a merchandise processing device, comprising:
  a camera that captures an image of merchandise associated with a barcode and a discount seal; and
  a processor configured to:
    processes the image of merchandise captured by the camera to detect the barcode and identify the merchandise based on the barcode;
    processes the image of merchandise captured by the camera to detect the discount seal that represents discount information;
    based on a price of the merchandise and the discount information, calculate a discount amount associated with the merchandise; and
    cause a display device to display the image contiguously associated with the discount amount in association with related information associated with the merchandise; and
    prevent illegal misappropriation of the discount seal comprising facilitating output, at another display device of an attendant terminal, the image displayed on the POS terminal in real time.

10. The POS terminal according to claim 9, wherein
the display device includes a latest display part configured to display information related to a most recently identified merchandise, and
the processor is further configured to:
  store related information associated with a first merchandise in a first buffer, store related information associated with the first merchandise from the first buffer to a second buffer when a second merchandise is identified, and store related information associated with the second merchandise in the first buffer,
  cause display the image contiguously associated with the discount amount in association with related information associated with the merchandise stored the first buffer, and
  cause display related information associated with the merchandise stored the second buffer in a list form.

11. The POS terminal according to claim 9, wherein the processor is further configured to:
output information displayed on the display device to a monitoring terminal.

12. The POS terminal according to claim 9, wherein the processor is configured to:
first identify the barcode and then identify the discount seal associated with the barcode.

* * * * *